April 30, 1963  G. E. MALZAHN  3,087,354
VARIABLE SPEED GEAR REDUCTION UNIT
Filed June 8, 1960  4 Sheets-Sheet 1
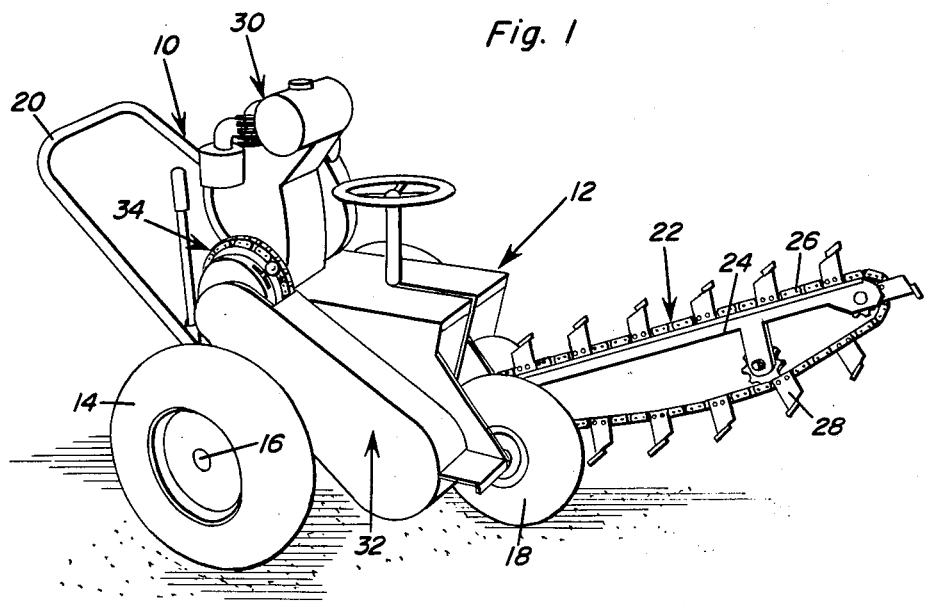
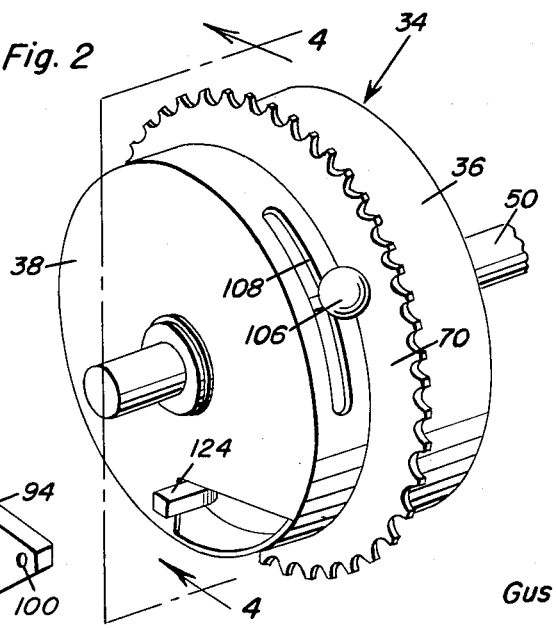
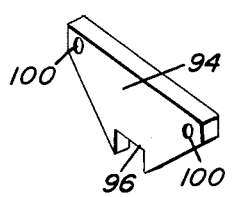
Gus E. Malzahn
INVENTOR.

April 30, 1963 G. E. MALZAHN 3,087,354
VARIABLE SPEED GEAR REDUCTION UNIT
Filed June 8, 1960 4 Sheets-Sheet 2

Gus E. Malzahn
INVENTOR.

BY *Clarence A. O'Brien*
*and Harvey B. Jacobson*
Attorneys

April 30, 1963  G. E. MALZAHN  3,087,354
VARIABLE SPEED GEAR REDUCTION UNIT
Filed June 8, 1960  4 Sheets-Sheet 3

Gus E. Malzahn
INVENTOR.

BY *Clarence A.O'Brien*
*and Harvey B. Jacobson*
Attorneys

April 30, 1963 G. E. MALZAHN 3,087,354
VARIABLE SPEED GEAR REDUCTION UNIT
Filed June 8, 1960 4 Sheets-Sheet 4

Gus E. Malzahn
INVENTOR.

United States Patent Office
3,087,354
Patented Apr. 30, 1963

1

3,087,354
VARIABLE SPEED GEAR REDUCTION UNIT
Gus E. Malzahn, % Charles Machine Works Inc.,
P.O. Box 66, Perry, Okla.
Filed June 8, 1960, Ser. No. 34,767
10 Claims. (Cl. 74—781)

This invention comprises a novel and useful variable speed gear reduction unit and more particularly pertains to a transmission gearing assembly especially adapted for power operated self-propelled ditch diggers.

The primary object of this invention is to provide a self-propelled ditch digger wherein a single power plant mounted thereon shall serve the joint purposes of operating a chain digger assembly to excavate ditches and shall propel the ditch digger at a relatively low speed during the digging operation and at a relatively high speed when the machine is to be moved and the ditching operation is to be temporarily discontinued.

A further and more specific object of the invention is to provide an improved gear reduction assembly interposed between the power transmitting mechanism connecting the power plant to the driving axles of the machine for the purpose of effecting operation of the propelling of the machine at two different speeds as desired.

A further object of the invention is to provide a gear reduction assembly in accordance with the foregoing object which shall have a greatly improved and compact construction.

Still another object of the invention is to provide a gear reduction assembly specifically adapted for the operation of a ditch digger and which will enable the operation and rotation of the propelling wheels and axles of the machine at two widely different speeds.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing one suitable embodiment of a ditch digging machine incorporating therein the principles of this invention, the chain digger assembly being shown in its raised position in which it is placed during the normal transportation of the device;

FIGURE 2 is a perspective view of the gear reduction assembly forming an essential feature of this invention;

FIGURE 3 is a detail perspective view of a stationary abutment means forming a part of the speed control and varying mechanism of the invention;

Figure 4:
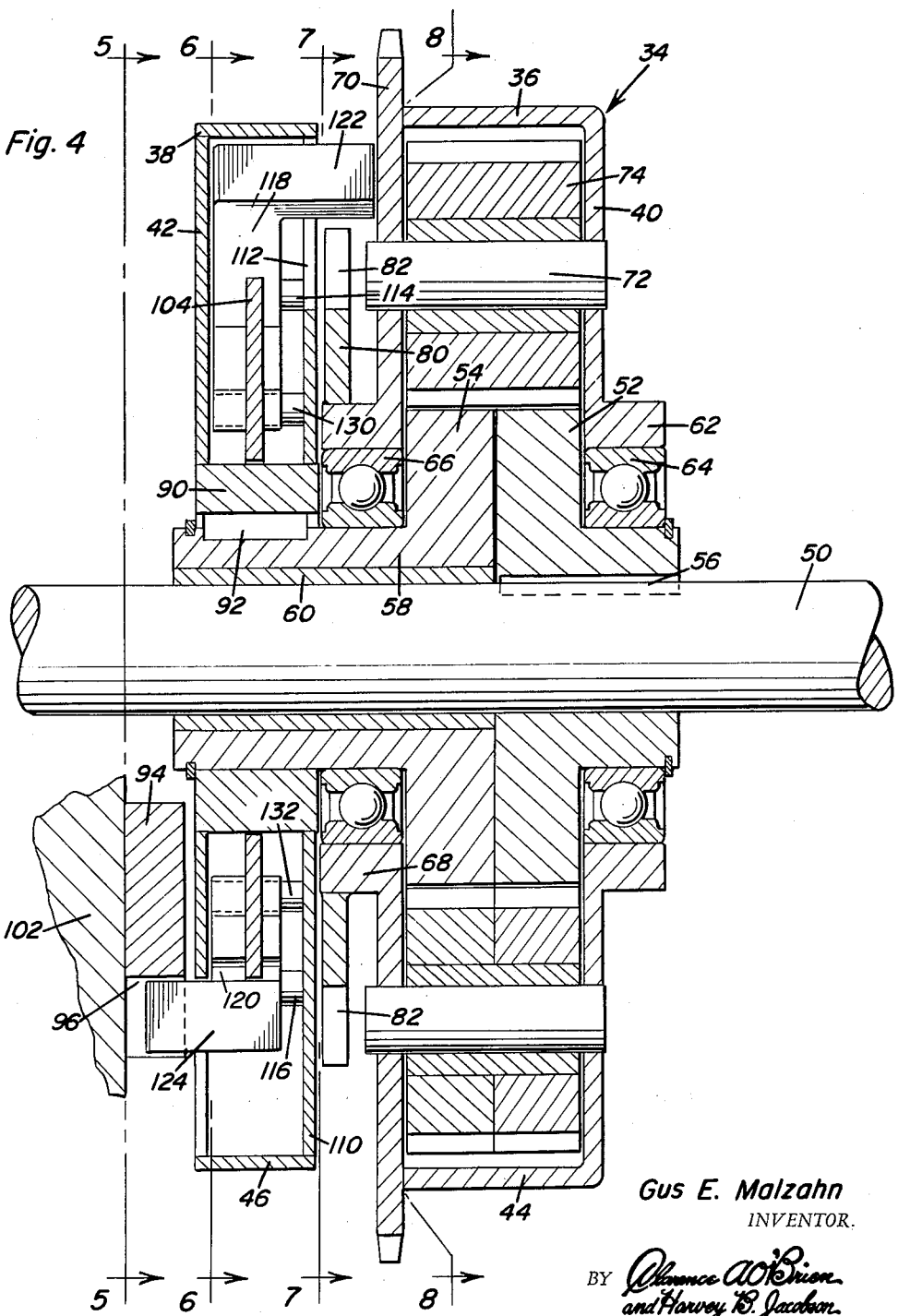
FIGURE 4 is a view in vertical longitudinal section taken upon an enlarged scale substantially upon the plane indicated by section line 4—4 of FIGURE 2 and showing the position of the parts of the transmission when the propelling mechanism is in one to one or high speed ratio.

Referring first to FIGURE 1 it will be observed that the numeral 10 designates generally the entire construction of the self-propelled ditch digger in accordance with this invention, the same including a mobile frame construction indicated generally by the numeral 12 and which is supported as by a pair of driving and supporting wheels 14 secured to driving axles 16. A forward support wheel as at 18 is likewise journalled upon the frame to provide a stable support for the latter, while a handle as at 20 serves to facilitate handling of the apparatus.

Mounted upon the frame 12 is a chain digger assembly

2 indicated generally by the numeral 22 and which consists of a suitable frame 24 having an endless chain 26 entrained thereon provided with digging elements 28 thereon. Inasmuch as the details of construction and operation of the chain digger assembly are of no consequence to the invention claimed herein, a further description of the same is deemed to be unnecessary, it being merely understood that the assembly is mounted to be pivotally lifted to a position shown in FIGURE 1, at which position the assembly is inoperative and the device can be readily transported from one location to another; or may be pivoted downwardly to a position at which the forward end of the chain digger assembly will penetrate the earth to the desired extent to perform the digging operation.

Mounted on the mobile frame 12 is a power plant 30 of any desired type which serves to supply power both to the axle 16 to propel the apparatus and to the chain digger assembly 22 to effect operation of the latter. A transmission gearing assembly indicated generally by the numeral 32 is provided whereby power is transmitted from the power plant 30 to a chain digger assembly 22 and to the wheel 16, the numeral 32 also indicating a casing housing for such mechanism. Inasmuch as the details of the transmission mechanism are in themselves no part of the invention claimed herein, a specific description of the latter is deemed to be unnecessary. However, in this power transmission there is included a gear reduction assembly indicated generally by the numeral 34 and which serves to vary the rotation imparted to the axle 16 from the power transmission assembly. It is this gear reduction assembly 34 which constitutes the key features of the invention as set forth and claimed hereinafter.

It will be understood that the reduction gear assembly may be mounted in any convenient portion of the transmission gearing assembly it being only necessary that it shall operate to enable widely different speeds of rotation to be imparted from the power plant to the axle 16 and the supporting and driving wheels 14 of the apparatus, while a constant speed of the power plant is being continued.

Referring now to FIGURES 2 and 4 in particular, for a description of the gear reduction assembly 34, it will be observed that this assembly includes a pair of casings or housings 36 and 38 having closing end walls as at 40 and 42 respectively with peripheral flanges or side walls as at 44 and 46. The two housings face each other, that is, have their end walls 40 and 42 disposed on opposite sides thereof so that the two chambers of the two housings face each other.

The housing 36 constitutes a gear casing for a planetary gear assembly to be referred to hereinafter, while the housing 38 encloses the gear shifting and lock mechanism to be hereinafter described.

Extending through the two housings is a power output member or power output shaft 50 and which serves to support both of the housings.

Referring now particularly to FIGURE 4 it will be observed that the planetary gear system previously mentioned includes a pair of sun gears disposed in side-by-side relation and of the same diameter comprising first and second sun gears 52 and 54. The first sun gear 52 is fixedly secured as by a spline connection at 56 to the shaft 50, while the second sun gear 54 has a hub or sleeve 58 which is rotatably journalled upon the shaft 50 as by a bearing member 60. It should be understood, however, that the gears 52 and 54 have a different number of teeth, this difference conveniently being one tooth. Thus the gear 54 may consist of 40 teeth while the gear 52 has 39 teeth. Obviously, any other suitable gear ratio can be employed for this purpose.

Figure 8:
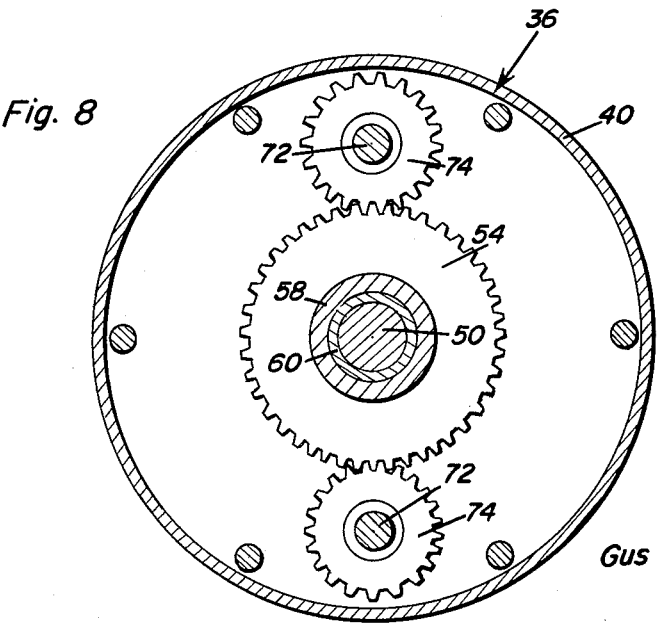

The previously mentioned casing 36 is provided with a hub portion 62 which receives therein a bearing assembly 64 by means of which the casing is rotatably journalled and mounted upon the first sun gear 52. Journalled upon the hub 58 of the second sun gear 54 as by bearing assembly 66 is the hub 68 of a power input member comprising a sprocket gear 70 which is driven by a chain from the power plant 30. The shaft 50 is driven by the reduction gear assembly 34 and thus is the power output shaft thereof while also constituting the power input shaft for the vehicle transmission 32. This sprocket gear 70 lies between the two casings 36 and 38 and conveniently comprises a closure wall opposite to the end wall 40 for the casing 36. The casing 36 and the sprocket 70 are fixedly secured together by pins 72 which constitute axles upon which are received planet gears 74. As will be observed from FIGURE 8, in conjunction with FIGURE 4, there are provided a pair of such planet gears, each planet gear 74 having continuous engagement with both the first and second sun gears 52 and 54.

Figure 7:
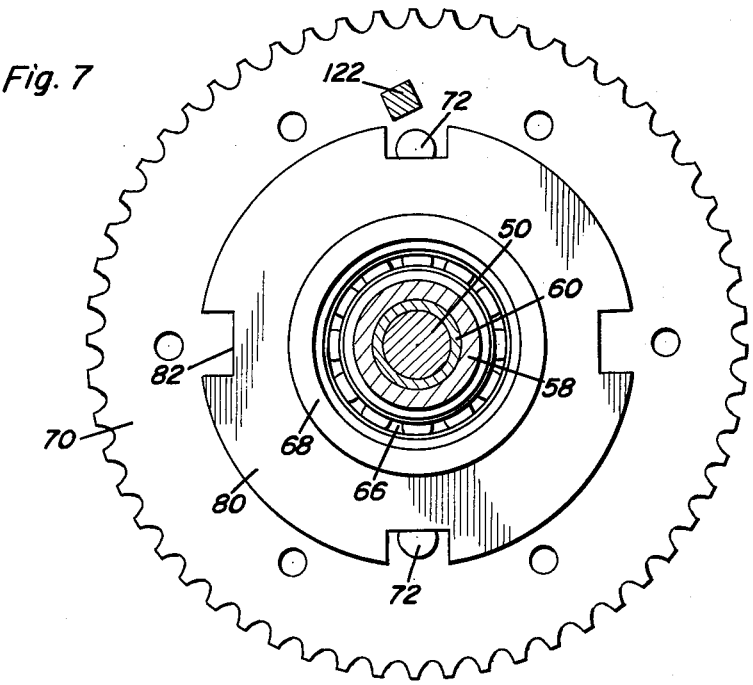

Referring now particularly to FIGURES 4 and 7 it will be observed that the hub 68 of the sprocket 70 has secured thereto a radially extending lock plate 80. This plate is provided with a plurality of peripheral notches as at 82 for the reception of a locking element to be hereinafter described.

Referring next to FIGURE 4 it will be observed that the previously mentioned casing 38 has its hub 90 fixedly secured as by splined connection 92 to the previously mentioned hub 58 of the second sun gear 54 whereby the casing 38 is fixed to and revolves with the sun gear 54.

Figure 5:
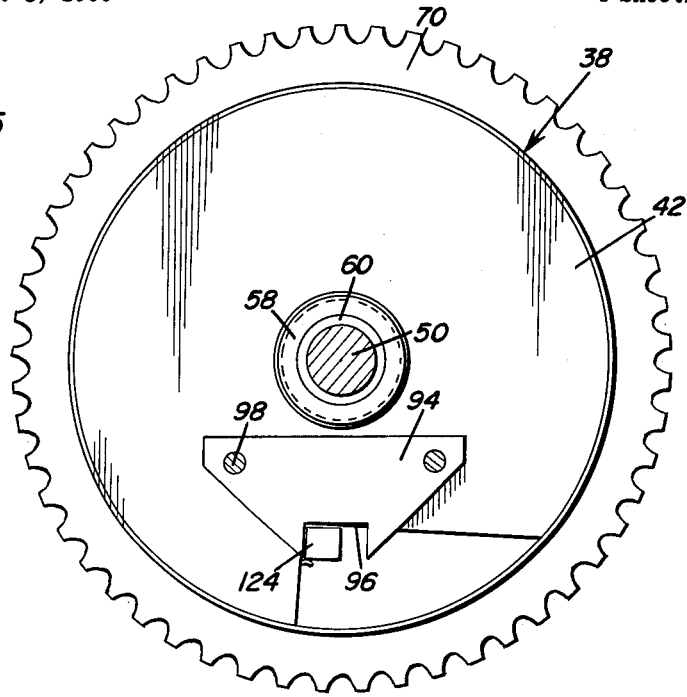
FIGURES 5–8 are vertical transverse sectional views taken substantially upon the planes indicated by section lines 5—5, 6—6, 7—7 and 8—8 respectively of FIGURE 4 and showing various details of the mechanism of the invention.

Referring next to FIGURES 3, 4 and 5 it will be observed that there is provided a stationary lock plate 94 having therein a locking notch 96 and which is secured as by fasteners 98, through apertures 100 to any suitable portion 102 of the mobile support frame 12 of the digging apparatus.

Figure 6:
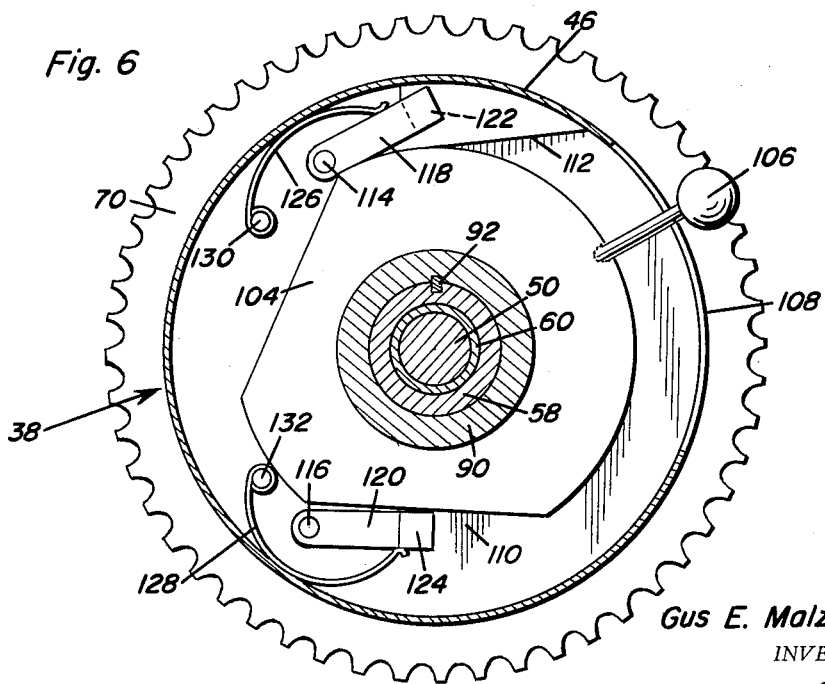

Referring now to FIGURES 4 and 6 in particular it will be observed that a cam plate 104 is fixedly secured in any suitable manner to the hub 90 and is provided with an operating handle 106 extending through a peripheral slot 108 in the casing 38. The disposition of this slot and handle is shown more clearly in FIGURE 2. Thus, although the cam plate 104 rotates with the casing 38, it is in addition rotatable relative thereto within the confines of the slot 108 by the handle 106, for a purpose which will be subsequently apparent.

As shown in FIGURES 4 and 6, secured to the hub 90 of the housing 38 is a lock plate 110 having a notch 112 in the periphery thereof which is adapted to register with previously mentioned notch 82 in the lock plate 80 of the sprocket wheel 70 as shown in FIGURE 4. A pair of locking pins are provided. Each lock pin has as shown in FIGURE 6 a pivot 114 or 116, there being a crank arm 118 journalled by pivot 114, and a similar crank arm 120 being journalled by pivot 116. Projecting to opposite sides of the two arms 118 and 120 from their pivot pins are lock pins 122 and 124. A pair of leaf springs 126 and 128 have one end of each secured to an anchor post as at 130 and 132 which are mounted upon the previously mentioned plate 110 and have their other ends engaging the arms 118 and 120 to thereby yieldingly urge the lock pins into their radially inwardly retracted position against the periphery of the cam plate 104.

The operation of the invention in accordance with the foregoing construction is as follows: When the locking cam plate 104 is rotated in one direction, the peripheral cam surface thereof will because of the position of the arms and the shape of the cam engage one of the arms either 118 or 120 and thus cause a radially outward movement of the stop pin 122 and 124 carried thereby. When either of the two pins is moved radially outwardly, by the cam 104, it will be in its disengaged or released position such as the position shown for the pin 122 in FIGURE 4 and in FIGURE 7.

At that time the spring 128 will force the other arm 120 with its pin 124 radially inwardly to thus cause the pin 124 to engage in the notch 96 of the abutment plate 94. Thus, as shown in FIGURES 4 and 5 in this position engagement of the stop pin 124 in the notch 96 of the abutment plate 94 will thus lock the casing 38 to the machine frame 12 and against rotation, and thus will hold the second sun gear 54 and its sleeve 58 likewise against rotation.

In this position, with the lock pin 124 engaged in the lock plate 94, the sun gear 54 is held stationary. As the power unit rotates the sprocket gear 70 and thereby the casing 36 the planet gears 74 secured thereto will rotate about the axis of the shaft 50. Upon one complete rotation, the planet gear 74 will rotate the same number of teeth as the sun gear 54. Since the first sun gear 52 has one less tooth than the sun gear 54 and is also engaged by the planet gears 74, it is forced to turn backwards one tooth for each revolution of the casing 36. This produces a very slow reverse travel at a ratio of 1 to 40 of the shaft 50 and thus of the digging machine during the digging operation, which causes the machine to travel at the desired rate at which the digging operation is progressing.

When the cam plate 104 is moved in the other direction, the stop pin 124 will be disengaged from the stationary abutment 94 and the stop pin 122 will now be moved radially inwardly by a spring 126 to cause this pin to engage simultaneously in the two slots 112 and 82 thereby locking the casing 36 to the casing 38 and thus locking the first and second sun gears together so that the sprocket wheel 70 now turns with and at the same rate of speed as the input shaft 50. Thus a relatively high gear ratio is provided which, in the position of the apparatus as shown in FIGURE 1 enables the same to be readily transported from place to place at a much greater speed than is possible when in the lower gear ratio.

It will now be understood from the foregoing that the same power plant is employed to operate the chain digger assembly at a given speed and to provide a low speed drive of the propelling wheels of the apparatus so as to cause the same to move forwardly at a sufficient rate to enable the digging operation to progress efficiently.

However, when it is desired to dispense with the digging operation and to transport the device from place to place, the manually operated gear reduction assembly control 106 may be rotated within the slot 108 in the peripheral wall 46 of the casing 38 to thus shift the two stop or lock pins 122 and 124 to either a neutral position where both pins are disengaged from their associated notches so that the flow of power to the propelling wheel is cut off; or to a position in which the high speed stop or lock pin 122 is engaged in the notches 112 and 82 whereby the two sun gears are locked together effecting a one to one driving ratio between the power input shaft and power output means including the sprocket 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gear reduction assembly for a self-propelled trenching machine comprising a pair of casing members relatively rotatable, a power input member secured to one casing member, a power output shaft rotatably received in said one casing member, first and second sun gears of a different number of teeth disposed in said one casing member and surrounding said output shaft, said first sun gear being fixedly secured to and said second sun gear being rotatable upon said output shaft, a planet gear journaled in said one casing member and continuously engaged with both said first and second sun gears, a pair of locking means operable to alternately lock the other casing against rotation and release said casings from each other whereby to establish a low speed ratio drive between said power input member and said output shaft and to lock said casings together against relative rotation and release said casings for joint rotation.

2. The combination of claim 1 wherein said power input member is positioned between said casing members and is secured to and comprises a closure end wall for said one casing member.

3. The combination of claim 1 wherein said power input member comprises a sprocket gear of greater diameter than and whose teeth extend outwardly beyond the peripheral walls of said casing members, said sprocket gear being disposed between said casing members and being fixedly secured to and defining a closure end wall for said one casing member.

4. The combination of claim 1 wherein said pair of locking means is housed within said other casing section.

5. The combination of claim 1 wherein said pair of locking means is housed within said other casing section and has a manually operable handle extending through an opening in the peripheral wall of said other casing member.

6. The combination of claim 1 wherein said pair of locking means includes a stationary abutment plate exterior of and adjacent said other casing member and having a locking notch therein, a pair of lock plates each fixedly engaged with a casing member and each having registerable locking notches, a pair of lock pins each movably mounted upon said other casing member, one of said lock pins being engageable with said abutment plate notch whereby to lock said other casing member against rotation, the other lock pin being engageable in said lock plate notches whereby to prevent relative rotation between said casing members, actuating means for effecting movement of said lock pins in alteration.

7. The combination of claim 6 wherein said lock plate for said one casing member is mounted upon said power input member.

8. The combination of claim 7 wherein said lock plate for said other casing member is disposed in closely adjacent parallel relation to the lock plate of said one casing member.

9. The combination of claim 8 wherein said actuating means comprises a manually operable cam rotatably mounted in said other casing member, said lock pins being oscillatably journaled in said other casing member lock plate and having each an actuating engagement with the periphery of said cam.

10. The combination of claim 9 including springs mounted on said other casing member lock plate and each engaging said other casing member and a lock pin for biasing the latter towards said cam and towards locking engagement with its respective notches.

References Cited in the file of this patent

UNITED STATES PATENTS

| | | |
|---|---|---|
| 403,756 | Jetter | May 21, 1889 |
| 697,041 | Tenney | Apr. 8, 1902 |
| 1,108,268 | Stahl | Aug. 25, 1914 |
| 1,684,705 | Humphreys | Sept. 18, 1928 |
| 2,722,851 | Steiner | Nov. 8, 1955 |
| 2,749,756 | George | June 12, 1956 |
| 2,810,293 | George et al. | Oct. 22, 1957 |
| 2,842,873 | George et al. | July 15, 1958 |
| 2,990,631 | Brown | July 4, 1961 |

OTHER REFERENCES

Model M Ditch-Witch Trencher illustrated and described on pages 124, 125 of the July 1957 issue of Civil Engineering, vol. 27, No. 7.